United States Patent [19]

Meline et al.

[11] Patent Number: 4,831,738
[45] Date of Patent: May 23, 1989

[54] CAPACITIVE EXTENSOMETER

[75] Inventors: Harry R. Meline, Minnetonka; Eric L. Paulsen, Wayzata, both of Minn.

[73] Assignee: MTS Systems Corporation, Eden Prairie, Minn.

[21] Appl. No.: 893,799

[22] Filed: Aug. 6, 1986

[51] Int. Cl.[4] .............................................. G01B 7/10
[52] U.S. Cl. ..................................... 33/798; 33/147 D; 73/780
[58] Field of Search ................. 33/147 D, 148 D; 73/780, 781, 782; 324/61 P

[56] References Cited

U.S. PATENT DOCUMENTS

| 2,968,031 | 1/1961 | Higa | 340/265 |
| 3,206,970 | 9/1965 | Dally et al. | 73/780 |
| 3,400,331 | 9/1968 | Harris | 324/61 P |
| 3,729,985 | 5/1973 | Sikorra | 73/88.5 R |
| 3,789,508 | 2/1974 | Meline | 33/148 D |
| 3,852,672 | 12/1974 | Nelson | 328/1 |
| 4,098,000 | 7/1978 | Egger | 33/148 D |
| 4,449,413 | 5/1984 | Pugh | 73/780 |
| 4,532,810 | 8/1985 | Prinz et al. | 33/147 D |

FOREIGN PATENT DOCUMENTS 3410840 6/1985 Fed. Rep. of Germany ........ 73/780

OTHER PUBLICATIONS

Holmes, Alan M. C. and Michael C. Dugan, "Clip-On Extensometer", *NASA Tech Briefs*, pp. 96 and 97, Jan.-/Feb. 1986.

*Primary Examiner*—William D. Martin, Jr.
*Attorney, Agent, or Firm*—Kinney & Lange

[57] ABSTRACT

A capacitive extensometer utilizes an extensometer frame having a pair of arms connected together about a hinge axis at first remote ends, and having second ends which include specimen contacting members for engaging the surfaces of a specimen to be tested. A capacitive type sensing arrangement is mounted on the arms, and is used with conventional circuitry for determining arm motion with respect to each other. The sensor is made so that it can be adjusted, and also can compensate for nonlinearities by utilizing differently shaped elements. The ability to mount and protect the capacitor sensor appropriately, while obtaining a relatively large output signal enhances the operability of the extensometer.

14 Claims, 4 Drawing Sheets

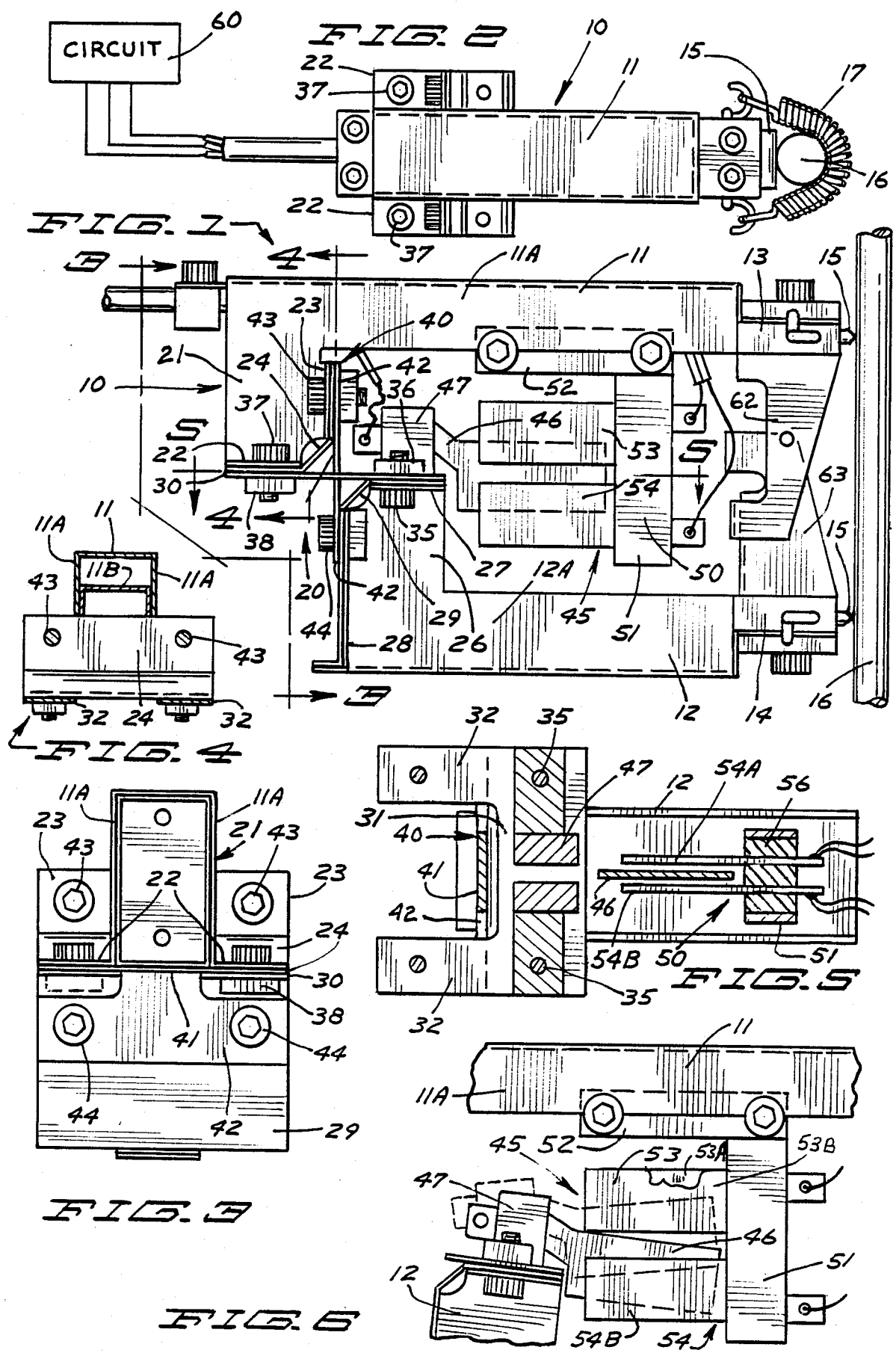

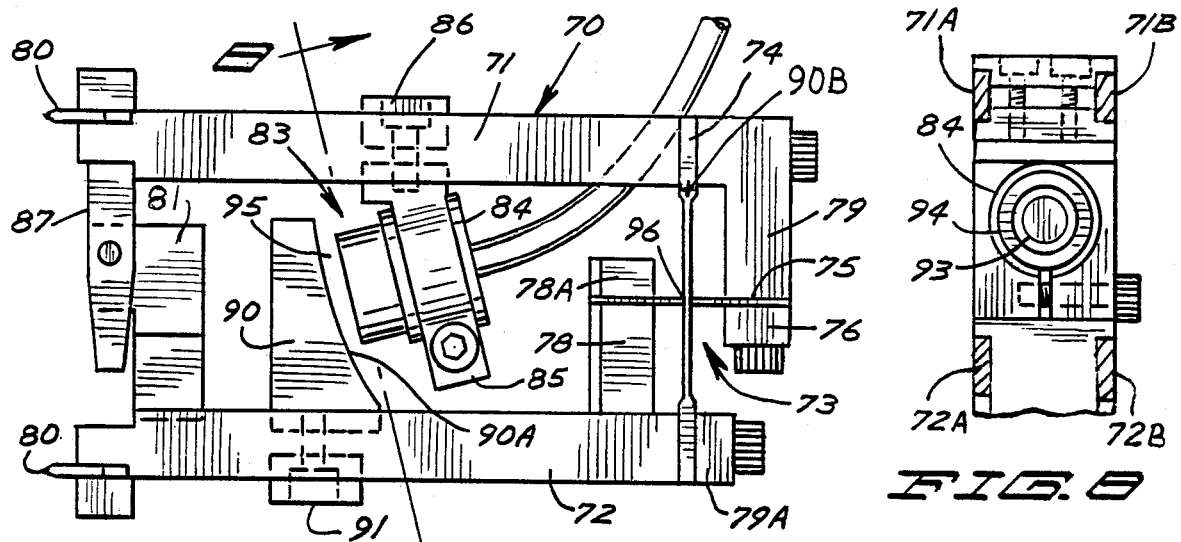
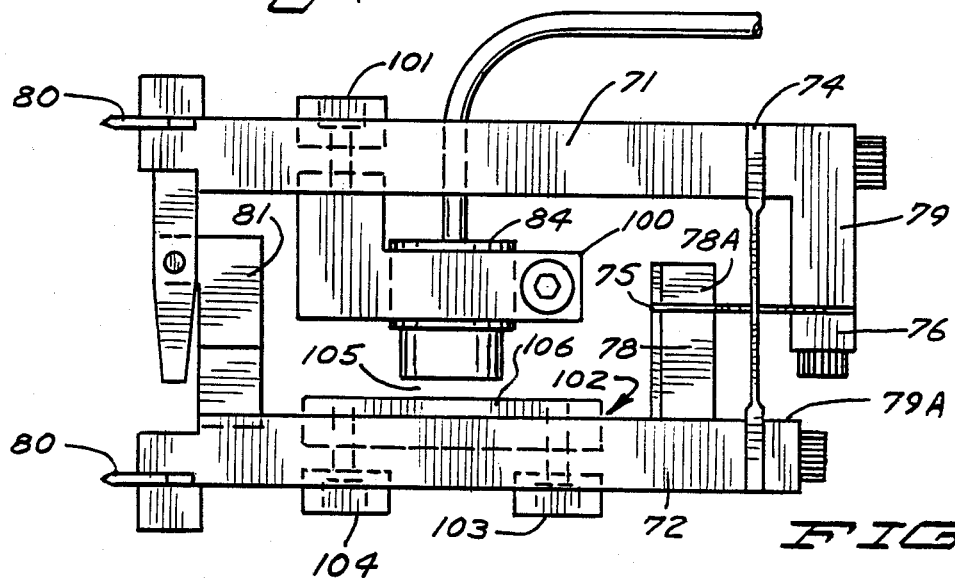
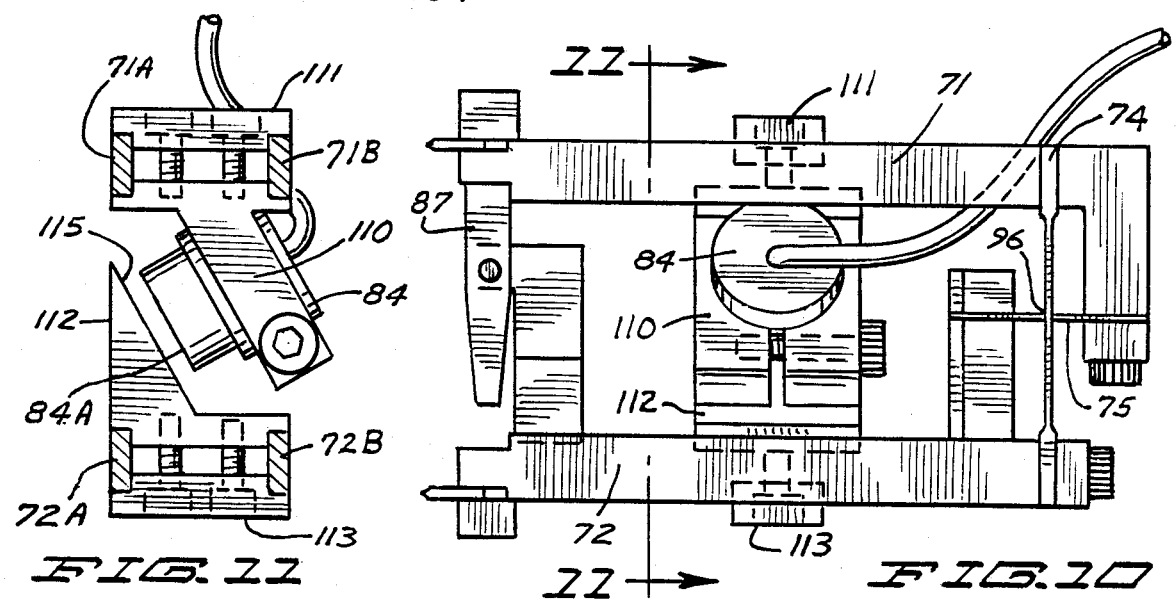

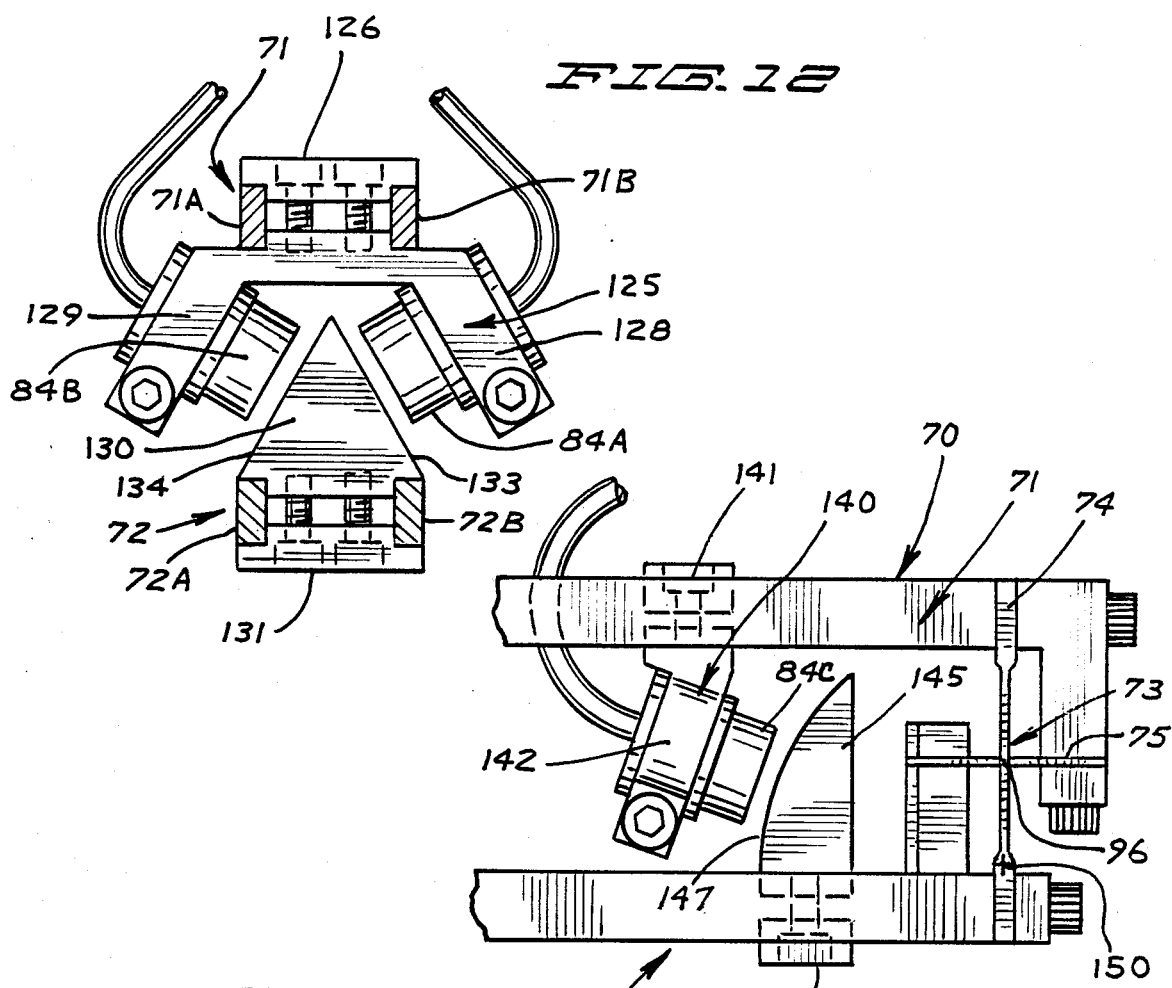
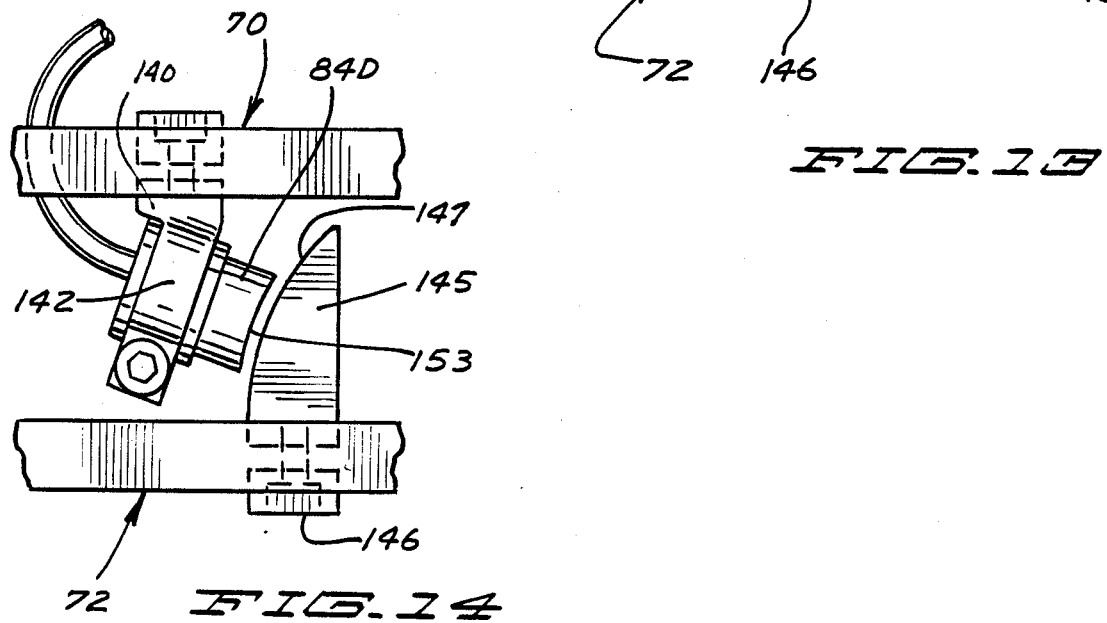

CAPACITIVE EXTENSOMETER

BACKGROUND OF THE INVENTION

1. Field of the Invention

The present invention relates to extensometers that use capacitive type sensing changes for indicating dimensional changes of a specimen.

2. Description of the Prior Art.

Extensometers are commonly used for measuring strain in a specimen and includes devices which utilize two arms held together by suitable cross flexure members as shown in U.S. Pat. No. 3,789,508. Strain gages applied to the cross flexure members are used for determining arm separation, and thus, specimen strain.

Capacitive sensing extensometers are known as well, but generally they are complex in operation, hard to adjust, and are not rugged and easily attached to the specimens.

SUMMARY OF THE INVENTION

The present invention relates to strain sensing extensometers having capacitive type detectors mounted on a pair of movable mounting member joined by flexure straps, and adapted to engage a specimen to be sensed at the other ends of the arms. Capacitive type detectors are mounted on the respective mounting members, so that upon movement of the members, when a specimen to which they are coupled is subjected to strain, a capacitive type change is sensed and the amount of change in signal is proportional to the strain in the specimen.

The present construction provides a rugged extensometer that provides a very usable signal with small amounts of movement, and which is easily mounted and adjusted. The capacitive type sensing members are mounted directly to the arms and can be adjusted as desired.

In addition to using relatively movable capacitor plates sensing pure capacitance, known capacitive reactance sensing probes are also used, as shown. The probes have a center capacitive plate and an outer concentric capacitive plate, commonly called a guard ring, which do not move relative to each other, but which will provide a signal depending on the proximity of the probe end to a conductor surface. For example, cylindrical capacitive reactance sensing probes made by Hitec Products, Inc. of Ayer, Mass., and sold as their HPC Series probes under the trademark "Proximic" have been shown to be suitable, and are illustrated in one form of the present invention.

In certain forms of the invention, properly configuring and moving the relatively movable members permits compensation for nonlinearities in the system. Mechanical compensation simplifies or eliminates the need for the correction or linearizing circuitry that is commonly required, and enhances accuracy.

BRIEF DESCRIPTION OF THE DRAWINGS

FIG. 1 is a side elevational view of an extensometer made according to the present invention;

FIG. 2 is a top plan view thereof;

FIG. 3 is an end view taken as on line 3—3 in FIG. 1;

FIG. 4 is a sectional view taken as on line 4—4 in FIG. 1;

FIGS. 5 and 6 are a fragmentary enlarged sectional view showing the capacitor plates used in greatly separated position, and showing a range of motion between the plates;

FIG. 7 is a side elevational view of a modified form of the device of the present invention;

FIG. 8 is a sectional view taken as on line 8—8 of FIG. 7;

FIG. 9 is a side elevational view of a further embodiment of the present invention showing a different capacitive type sensing probe oriented in a different relationship;

FIG. 10 is a side elevational view of a still further embodiment of the present invention with the probe positioned differently from that in FIG. 9;

FIG. 11 is a sectional view taken as on line 11—11 in FIG. 10;

FIG. 12 is a sectional view of a modified form of the present invention when viewed substantially along the same line as FIG. 11;

FIG. 13 is a fragmentary side elevational view of an extensometer assembly having a modified form of the capacitive type probe mounted thereon;

FIG. 14 is a further modified, fragmentary side view of an extensometer made according to the present invention showing a curved surface on the probe used in the embodiment of the invention shown in FIG. 13;

DETAILED DESCRIPTION OF THE PREFERRED EMBODIMENTS

Figures 15, 16:
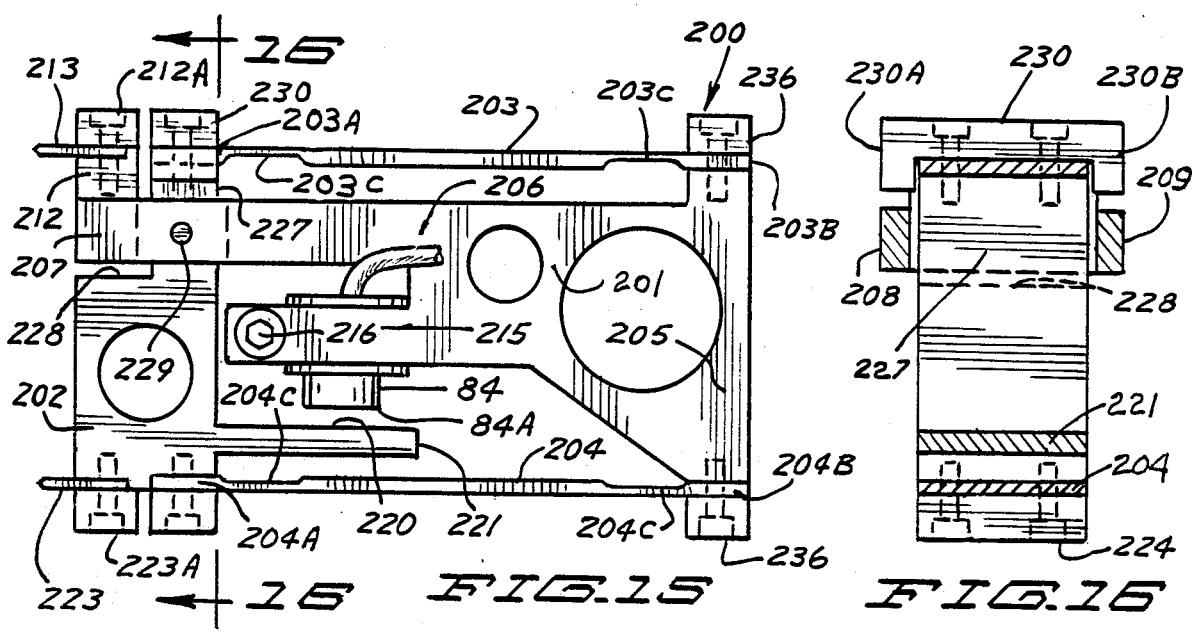
FIG. 15 is a side elevational view of a further modified form of the capacitive extensometer of the present invention showing parallel flexures for connecting the two movable parts of the extensometer frame.
FIG. 16 is a sectional view taken as on line 16—16 in FIG. 15.

A capacitive extensometer indicated generally at 10 has a pair of arms, including a first arm 11 and a second arm 12, which have outer end portions 13 and 14, respectively, adapted to mount knife edges members indicated generally at 15, that will engage a specimen 16 under resilient loading of an attachment spring indicated at 17 in FIG. 2. The attachment spring 17 surrounds the specimen 16 (the attachment springs are removed in FIG. 1 for clarity) and the knife edges will engage the surface of the specimen 16 under sufficient force so that if the specimen changes in length the arms 11 and 12 will shift relative to each other. Specimen engaging pins also may be used instead of knife edges.

The remote ends of the extensometer arms 11 and 12 are pivotally mounted together with a cross flexure assembly indicated generally at 20. The first arm 11 has a mounting leg portion 21 that depends from the main part of the arm. The arms 11 and 12 as shown in this form of the invention are made in formed metal sections that are generally U-shaped and have spaced apart side walls indicated at 11A from which the depending portion or leg 21 is formed. The side walls 11A are supported relative to each other by a cross support 11B having flanges spot welded in place to the legs 11A for rigidity. The leg portion 21 has spaced side walls forming continuations of walls 11A.

A pair of flanges 22 are formed one on the lower end of each of the walls forming leg 21. The flanges 22 extend at right angles outwardly from the lower edges of side walls of leg 21. The forward edge of each side wall of leg 21 has bent out flanges indicated at 23 extending laterally out from the forward edges of the legs 21. The flanges 22 and 23 on each of the walls of leg 21 are braced together with a separate brace 24, that is formed so that it will fit against and tie the flanges 22 and 23 on each side wall of the leg 21 together.

Likewise, the extensometer arm 12 has an upright support leg 26 having spaced walls. The arm 12 is also made of formed sheet of metal and has spaced apart side walls indicated at 12A. There is one wall of leg 26 integral with each of the side walls 12A. Each wall of support leg 26 has a flange 27 at its upper edges bent horizontally out at right angles to the side surfaces of the leg. The walls of leg 26 also have vertically extending flanges 28 on their forward edges that extend outwardly from the respective wall. The flanges 27 and 28 on the same side of the leg 26 are joined together with a brace 29 that fits over the flanges, and has an inclined portion extending therebetween to provide rigidity between the corresponding flanges 27 and 28 when they are clamped in place.

A first flexure member, or spring member indicated generally at 30 is generally U-shaped, having spaced legs 32,32 as can be seen in FIG. 5, and has a base member 31 that overlies the brace 29, and is supported by the flanges 27 on the opposite sides of leg portion 26 of arm 12. The flexure legs 32,32 extend rearwardly from the base 31. The legs 32 of the spring flexure member are supported against the surface of the brace member 24 and thus they are supported or held on both of the flanges 22 of the leg portion 21 of arm 11. The legs 32,32 are held clamped on the respective flange 22 with cap screws 37 which thread into suitable nut members 38 to clamp the legs 32,32 of the cross flexure member 30 in place and hold the braces 24 securely as well. The flexure member base 31 is clamped onto the flanges 27 and the underlying portion of the brace 29, using cap screws 35, threaded into a suitable clamp block 36.

A second cross flexure member indicated generally at 40 is "I" shaped and has spaced end portions 42 at the top and bottom thereof and a narrow center connector 41 as shown in FIG. 5. The tpp end portion 42 is suitably clamped with cap screws 43 to braces 24 and the respective flanges 23 on opposite sides of the arm 11. Cap screws 44 are used to clamp the lower end portion 42 of cross flexure 40 to brace 29 and vertical flanges 28. The cap screws 43 and 44 thread into suitable nuts to securely hold the assembly together. The braces 24 and 29 are clamped relative to the respective flanges to provide rigidity.

The planes of the flexure members 30 and 40 intersect along a pivot hinge line so the two arms 11 and 12 may pivot relative to each other. The pivoting using the flexure members is known in the prior art. In this device the arms are made of formed sheet metal sections which are extremely light and give fast response without adding inertia to the test system.

Movement of the arms 11 and 12 relative to each other is sensed with a capacitive type sensor assembly 45, providing a pure capacitance change output. The sensor assembly 45 includes a common plate 46 that is mounted onto the arm 12 through a mounting block 47, which is integral with clamp block 36. The mounting block 47 is thus connected to the flanges 27 through the cap screws 35.

Additionally, there are first and second capacitor plate sets 53 and 54 mounted on a plate assembly 50 that includes a support leg 51 that is clamped with a suitable clamp assembly 52 to the extensometer arm 11. The plate assembly 50 includes a first capacitor plate set 53 formed of two parallel, spaced apart blades that are mounted in an insulating potting material in the support leg 51. The second capacitor plate set 54 is made up of two parallel blades, and these can be seen in FIG. 5 as 54A and 54B, and as can also be seen in FIG. 5, the blades 54A are mounted in an insulating potting material shown at 56. The common plate 46 passes between the blades 54A and 54B, and also between the two blades forming the capacitor plate set 53, which are mounted identically to the blades 54A and 54B.

The unit thus makes a differential capacitor, so that as the common plate 46 moves between the capacitor plate sets 53 and 54 there is a change in capacitance between each of the plate sets 53 and 54 and the common plate 46, and the changes in capacitance are sensed by a known differential capacitance sensing circuit indicated at 60. The electronics are commercially known, and can be any desired.

The capacitance plate assembly 50 can be adjusted longitudinally along the arm 11 to change the overlapping relationship of the respective plates. The sensing is very simple, very accurate, and highly responsive to movements of the specimen 16.

The arms 11 and 12 include a stop assembly including a first stop member 62 mounted on the arm 11 at the outer end thereof (the end adjacent to the specimen) and a second stop member 63 that is connected to the arm 12. The stop members 62 and 63 have interfitting portions which will abut or engage to prevent excessive separation when the arms 11 and 12 move apart.

As can be seen in FIG. 6, as the parts move, the common plate 46 will change in its amount of registry with the blades forming the respective plate sets 53 and 54 to change the capacitance output.

The plate 46 could be a grounded shield plate, if desired, with the plates 53B and 54B (on the same side of plate 46) being connected as excitation plates. The plates 53A and 54A (on the opposite side of plate 46) would be wired together to become effectively a single receiver plate. The position of plate 46 would affect the sensed capacitance signal at the effectively single receiver plate 53A and 54A to provide a change in output depending on the position of plate 46. The two wired together receiver plates 53A and 54A would be differentially shielded by plate 46 to cause an output as a function of the different amount of shielding of plates 53A and 54A. High level capacitance output signals which are very accurate are obtained.

FIGS. 7 and 8 show a modified form of the invention comprising an extensometer assembly indicated generally at 70, having a first arm 71, and a second arm 72 mounted together with a flexure assembly 73 comprising a first flexure strap or member 74 and a second flexure strap or member 75. This is a conventional cross flexure mounting assembly wherein the planes of the flexure members intersect and the flexure member 75 passes through an opening in the center of the flexure member 74. One end of the flexure member 75 is clamped with a suitable clamp plate 76 to a block 79 which is used to clamp flexure member 74 to the arm 71. The other end of the flexure member 75 is clamped to the arm 72 with a clamping block indicated at 78 fixed to arm 72. A plate 78A is used to clamp the end of strap 75 to the block 78. As stated, one end of flexure member 74 is clamped to the end of the arm 71 with block 79, and the opposite end of the flexure member 74 is clamped with clamp member 79A to the end of arm 72.

The arms 71 and 72 have suitable knife edges 80 for engaging a specimen to be tested, and an over travel stop assembly 81 that is used in a normal manner.

A second form of the capacitive type sensing assembly is shown at 83, and utilizes a capacitive reactance type proximity detector 84 mounted on a suitable adjustable bracket 85 that clamps the proximity detector (which is cylindrical as can be seen in FIG. 8) in position. An adjustable clamp 86 is used for clamping the bracket 85 to the arm 71 and permitting it to be adjusted in position longitudinally along the arm toward and away from a conductive target member indicated generally at 90 which can be sensed by the proximity detector 84. The target 90 is made to slide along the arm 72 and can be secured with a clamp 91 that can be loosened for permitting the target 90 to be slid longitudinally, and then reclamped with the target in the desired position.

As can be seen in FIG. 8, the proximity detector 84 includes a first center capacitive plate 93 and a second outer concentric capacitive plate 94, commonly called a guard ring. These plates 93 and 94 are electrically insulated from each other and comprise capacitive reactance detectors to detect the gap between the target member 90, in particular, the surface 90A of the target member 90, and the adjacent end of the proximity detector 84. This gap is shown at 95 in FIG. 7 and it can be seen that by making the surface 90A other than a cylindrical surface concentric with the axis of pivot 96 of the flexure members 74 and 75, the proximity detector 84 will move toward or away from the surface 90A as the arms 71 and 72 pivot toward and away from each other. The change in relative position of the arms 71 and 72 is thus detected by the proximity detector 84.

The proximity detector 84 also can be used in the position that is shown in FIG. 9, which is a further modified form of the invention, using the same extensometer as that shown in FIGS. 7 and 8. In the form shown in FIG. 9, the proximity detector 84 is mounted on an L-shaped bracket 100 which has a clamp member 101 for permitting the bracket to be clamped to the arm 71 of the extensometer. The proximity detector 84 is positioned above a target plate 102 that is clamped with a pair of clamps 103 and 104, respectively, to the arm 72. The axis of proximity detector 84 is perpendicular to the target plate 102.

It can be seen that the arm 72 of the extensometer has a pair of side legs 72A and 72B as shown in FIG. 8, and the arm 71 has spaced side legs 71A and 71B so that there is a center opening between these legs or straps, for permitting suitable clamping members to be received.

In FIG. 9, the movement of the arms 71 and 72 relative to each other will of course increase or decrease the gap indicated at 105, and the surface 106 of the plate 102 is a conductive surface which affects the capacitive reactance between the plates 93 and 94 of the proximity detector. The conductive surface is tied electrically to the grounding circuitry of the capacitive electronics. The proximity detector shown is made by Hitec Products, Inc. of Ayer, Mass., and is a conventional proximity detector probe.

A further modified form of the invention is shown in FIGS. 10 and 11 wherein a proximity detector 84 is mounted on a bracket 110 and is clamped to the arm 71 of the extensometer assembly with a suitable clamp member 111. The proximity detector is positioned so that its central axis is at an angle with respect to the axis 96 at the center of the flexure members 74 and 75. Further, the axis of the proximity detector extends in direction laterally across the arms but at an angle to the planes of the arms 71 and 72. A target member 112 is provided on the arm 72, and is clamped in place with a clamp plate 113 using suitable cap screws. The target member 112 has a planar or slightly curved surface 115 that is generally perpendicular to the axis of the proximity detector 84 in a rest position, but is inclined relative to the planes of the arms 71 and 72 at an oblique angle.

As shown, the surface 115 is also at an angle with respect to the axis of hinging 96 of the arms 71 and 72 formed by the intersection of the flexure members.

As the arms 71 and 72 separate during loading of a specimen (not shown in this form) the movement of the proximity detector 84 as the arms separate will cause end surface 84A to move farther from surface 115. When the proximity detector is connected to suitable sensing circuitry, a signal will be provided which indicates the position that the proximity detector has assumed relative to surface 115. The incline of the surface 115 relative to the axis of pivot of arms 71 and 72 can be changed to accommodate for change of sensitivity of the output signals if desired. Surface 115 may be made with a slightly curved cross section shape to tend to compensate for minor nonlinearities if desired. Very accurate signals from the sensor substantially linear with respect to the gap can be obtained using commercial electronics.

The proximity detector and the target member 112 are adjustable along the lengths of the arms 71 and 72 for changing the sensitivity and providing an accurate output signal proportional to the strain of the specimen, which is in turn caused by the loading of the specimen.

In FIG. 12, a modified form of the device shown in FIGS. 10 and 11 is illustrated. Extensometer arms 71 and 72, having portions 71A, 71B and 72A and 72B are shown.

In this form of the invention, there are two proximity detectors indicated at 84A and 84B. The detectors are mounted on a bracket 125 that in turn is clamped with a suitable clamp member 126 to the arm portions 71A and 71B. The clamp member 126 has clamp portions 128 and 129 which extend out on opposite sides of the arms. Clamp portion 128 mounts the proximity detector 84A, and clamp portion 129 mounts the proximity detector 84B.

A target member indicated at 130 is mounted onto the arm portions 72A and 72B with a suitable clamp member 131 that clamps the target member in place. As shown, the target member 130 has upwardly extended surfaces 133 and 134, which taper toward each other in direction toward arm 71. The surfaces 133 and 134 are adjacent to and generally parallel to the ends of the proximity detectors 84A and 84B, respectively. These surfaces have a sufficient length in direction along the length of the arms to provide a suitable target surface. The length of the member 130 is substantially equal to that shown for the target member 112 in FIG. 10.

When two proximity detectors are utilized as shown, the output signal can be increased by connecting the proximity detectors in a two channel sensing circuit.

The device shown in FIG. 12 is useful in that the electrical effect of any side to side movement or lateral movement of the arms 71 and 72 relative to each other can be cancelled, because one of the proximity detectors would be moving closer to its associated surface while the other detector was moving an equal amount away from its associated surface 133 or 134, respectively.

The two target surfaces are symmetrical about a central longitudinal plane and with detectors also symmetrical about this plane they provide position sensing that is not as easily affected by side to side arm movement as the device shown in FIG. 11.

The target surfaces 133 and 134 can be made convex or concave to compensate linearity as the arms 71 and 72 separate. The proximity detectors 84A and 84B both move away from the adjacent surfaces 133 and 134 simultaneously, to provide an indication of extensometer arm movement, which in turn is an indication of specimen elongation or other motion being sensed.

FIG. 13 illustrates a further modified form of the invention wherein the surface of the target member is curved to be convex, or in reverse direction from the curvature shown in FIG. 7. The direction that the proximity detector faces is reversed as well in that the gap sensing end of the detector must face the target surface.

In FIG. 13, the extensometer 70 is constructed as shown in FIGS. 7-11, and has a first arm 71 and a second arm 72 which are pivotally mounted together at first ends with a cross flexure assembly 73. The cross flexure assembly is made in the same manner as previously described.

In this form of the invention, a proximity detector 84C is mounted on a suitable clamp bracket 140 that has an upper portion 141 that clamps onto the arm 71. The bracket 140 has a lower clamp portion 142 that receives the proximity detector 84C and holds it in place. The proximity detector 84C is made as previously described, and is positioned adjacent to a target member 145 which is held onto the arm 72 with a suitable clamp 146. The target member 145 has a target surface 147 that is a convex surface facing the proximity detector 84C. In cross section, the curve of the surface 147 is a part circle but the center of the arc is not at the pivot axis of the extensometer arms. For example, the axis of the surface 147 as shown is located at center point 150, which is below the intersection of the flexure members 74 and 75. The cross flexure intersection, which is shown at 96, is the hinge axis or hinge line for the arms 71 and 72 as the outer ends of the arms tend to separate. Thus, as the arms 71 and 72 pivot, each degree of pivoting about the hinge axis shown at 96 will cause a spacing change or gap between the end of the proximity detector 84C and the target surface 147. As can be seen with the center point 150 positioned as shown, the spacing between the end of the proximity detector 84C and the surface 147 will increase as the outer ends of the arms tend to separate.

FIG. 14 shows a further modified target member and proximity detector. A proximity detector 84D is mounted in a bracket 140 such as that shown in FIG. 13, and is held in a clamp 142 relative to target member 145 which is the same as the target member shown in FIG. 13. The target member 145 has a convex surface 147. The sensing end surface indicated at 153 of the proximity detector 84D is ground to a radius that generally corresponds to the radius of the surface 147, so that as the detector moves, the effects of changing spacing at the outer peripheral edges of the proximity detector or probe, commonly called the fringe effects, are minimized. The center of the arc of surface 147 is also positioned so the gap between surface 147 and surface 153 changes as the extensometer arms pivot.

In the present embodiments, two different forms of sensing are shown. The first is a pure capacitance measurement using a constant gap system such as that shown in FIG. 6, where the area between the capacitor plates changes, as the arms separate. Variable area capacitors generally will use a constant voltage supply for excitation, and the capacitor plates will be coupled into a one half bridge configuration, which is commonly known. This configuration is very sensitive to changes in gap caused by any side to side movement of the arms. Thus in FIG. 6, in particular, if the extensometer arms shift side to side substantial inaccuracies will result.

When using a capacitive reactance proximity detector such as those shown at 84–84D, the sensing circuitry uses a constant current circuitry system and the output will be variable voltage. With a constant current sensing circuitry the voltage output from the circuitry using capacitive reactance detector 84–84D is basically linear with gap change except for second and third order effects, as distinguished from pure capacitance sensors.

Since it is known that even with the proximity detectors there is a certain nonlinear output in the constant current circuitry, due to "fringe" effects and the like, the target surface can be configured for compensation. In FIG. 7 a concave surface is shown as a target surface for a proximity detector and by making the radius of the surface 90A a smaller or larger radius than the radius of movement of the extensometer arms, nonlinear changes in the gap will result in variation in output signals which can be selected to compensate to a certain extent at least, nonlinearities of the constant current output circuitry. Using the extensometer geometry, one can vary the incremental change in spacing of the probe and target surface at different positions of the extensometer arms by moving the center of the arc of the curved concave surface 90A in a selected direction from its normal location, which would be generally along a bisecting plane of the flexure member 74. Usually, the center for the arc 90A would be at a center point shown at 90B (FIG. 7), and the center of convex arc 147 (FIG. 13) would be at center point 150, so that as the extensometer arms tend to separate, the proximity detector or probe then would move farther away from the target surface for each degree of pivoting of the arms as the spacing between the outer ends of the extensometer arms increases. The distance that the center 90B or the center 150 is offset vertically from the pivot axis 96 of the arm determines the gain or span of the output There is a nonlinearity in proximity probes 84. The detectors have a slight droop to their output curve when output is plotted relative to spacing from a target surface, and this is primarily caused by fringe effects such as stray capacitive reactance signals along the edges of the detector as the spacing increases. By properly selecting the target surface curvature, and also selecting the position of the center of the curvature of the target surface relative to the pivoting axis of the arms, certain nonlinearities can be compensated for. A "best fit" approximation for linearity can be made by calibration and experimentation and some linearity compensation can be achieved by making the radius of the curvature of the target surface longer or shorter. For example, moving the center 90B or the center 150 horizontally from the position shown in FIGS. 7 and 13 will provide linearity compensation. Thus, the center of arc is located to achiev desired range or gain as well as some linearity compensation and the radius of the target surface also is selected to aid linearization.

The target surfaces do not have to have a uniform radius curve, but could have a changing radius along the surface.

While various methods of hinging the extensometer arms are possible, when using capacitive sensing it can be seen that any looseness or compliance in the hinge can be very detrimental. The cross flexure mounting is very rigid in resisting side to side arm movement and is thus very effective.

The electronics used may be commercially available capacitive sensing circuits.

In FIGS. 15 and 16, a modified form of the invention is shown and comprises an extensometer 200 that is made up of a main mounting frame or member 201, and a second mounting block or member 202 that is movable relative to the main mounting frame or member. The second mounting block or member 202 comprises a block that is supported onto the main mounting frame 201 through the use of parallel flexure straps or links indicated at 203 and 204, respectively.

The main frame 201 has a base end 205, with a center portion 206 and an arm portion 207 at the opposite end of the main mounting frame from the base. The arm portion 207 has offset side strap members 208 and 209 (as perhaps can be seen best in FIG. 16) on opposite sides thereof, and the side strap members are joined with a mounting block 212 that has a first knife edge 213 mounted on block 212 with a clamp 212A. The knife edge 213 is used for engaging a specimen to be tested. The knife edge is held against the specimen using a suitable resilient member or other fastening devices. The block 212 is fixed with bolts or the like to the side members 208 and 209.

The frame center portion 206 is provided with a mounting clamp or neck 215 in which a proximity detector 84 is mounted. The proximity detector 84 is clamped in place. Clamp 215 is a split clamp using a fastening bolt 216. The proximity detector 84 is the same as the proximity detectors shown in the previous forms of the invention and has an end 84A that is positioned adjacent to and detects the position of a flat surface 220 of a position indicating arm 221. The end surface 84A corresponds to the end surface of the previous proximity detectors, and the proximity detector is of the capacitive-reactance type, operating in the manner previously explained.

The arm 221 is integral with the second mounting block 202, and as can be seen the block 202 has a lower surface that mounts a second specimen engaging knife edge 223 clamped in place with a clamp block 223A. A clamp 224 is used to clamp a first end portion 204A of the flexure strap 204 onto the mounting block 202. The second or opposite end 204B of flexure strap 204 is clamped to the base end 205 of main mounting frame 201. The upper portion of the mounting block 202 is formed into a neck 227 which passes between the arms 208 and 209, and as shown in FIG. 16, the first end 203A of the flexure strap 203 is clamped on the upper surface of the neck of mounting block 202 with a cap member 230. The second or the opposite end 204B of flexure strap 204 is clamped with a clamp block 236 on the lower side of the base 205 of the main frame 201. The flexure straps 203 and 204 mount and guide the block 202 relative to the main frame.

The neck 227 is formed with a shoulder 228 that provides a space for the block 212 to move as the specimen is loaded and subjected to strain. The cap member 230 has side flanges or lugs 230A and 230B on opposite sides thereof that hold the flexure strap 203 in position, and the flanges 230A and 230B overlie the arms 208 and 209, and it can be seen that they limit the travel of the block 202 in direction tending to cause separation between the knife edges 213 and 223. The strap or limit is provided by engagement of the lug 230A and 230B and the arms 208 and 209.

The shoulder 228 formed will abut against the lower edge of the block 212 that is used for mounting the upper knife edge 213 to prevent excessive travel of the knife edges 213 and 223 toward each other. Thus there is a stop provided mechanically for preventing overtravel of the knife edges toward each other. Note also that a lock or zero set pin opening 229 can be provided through arms 208 and 209 and neck 227.

The flexure straps have reduced thickness hinge portions adjacent the opposite ends thereof. The flexure beam 203 has reduced thickness portions 203C, and flexure strap 204 has reduced thickness portions 204C adjacent the opposite end portions of the respective flexure beam. This insures that the hinge or flexing action that is permitted when the extensometer is in use and the knife edges separate or move together as the specimen is loaded, will occur at locations adjacent the end portions of the flexure beams, to provide maximum stability. The hinge points are positioned close to the ends of the flexure straps because this provides the maximum stiffness in directions other than the hinging movement desired.

The movement between the knife edges 213 and 223, which is an indication of strain in a test specimen, is sensed by the proximity detector 84 which will provide an output that represents the spacing between the surface 84A and the surface 220, to thereby provide an output that is proportional to specimen strain. The use of the flexure straps provides great rigidity in side to side directions, and frictionless hinging action at the reduced thickness portions of the flexure beams at 203C and 204C to easily hinge when the specimen is strained.

Additional features of the construction, in addition to the great rigidity, and the frictionaless pivot movement is that the two knife edges move parallel in that the frame block 202 and flexure straps 203 and 204 form a parallelogram, so there is not any substantial changing of the orientation of the knife edges relative to the specimen axis during operation.

A further feature is that the mass of the extensometer of the present device can be supported primarily on the upper knife edge 213. The movement of the specimen under strain is accommodated primarily by the lower knife edge 223 which has less mass coupled to it. In rapid cyclic testing, the inertia effect of the extensometer therefore is reduced because the lowest mass is on the knife edge at the bottom, where there generally is more movement.

The coupling cable for electrical circuitry for the probe 84 also is supported on the main frame and thus is supported by the upper knife edge 213.

The capacitive-reactance detectors using the extensometer shown in FIGS. 15 and 16 is thus less susceptible to problems from mechanical construction and gives good response.

It should be noted that the flexure beams 203 and 204 can be machined as one piece units with the frame to reduce hysteresis caused by clamping, except that there is always the need to bolt on some parts in order to provide for assembly. Elimination of bolted couplings between the flexure members 203 and 204 and the main frame, or the mounting block 202, eliminates hysteresis or slippage that can otherwise occur under certain conditions in bolted joints.

Using the parallel flexure straps and a single proximity probe 84 does eliminate some nonlinearities in the output, for example those caused by accurate movement of the previously disclosed extensometer. However, the linearity corrections are primarily achieved in the electronic circuitry.

Figure 17:
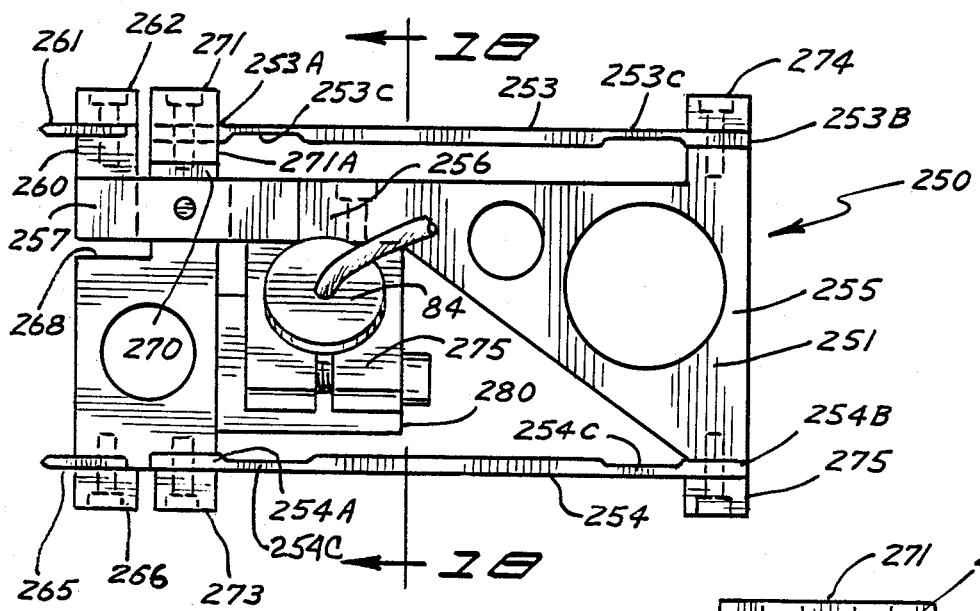
FIG. 17 is a further side elevational view of a further modified form of the extensometer of the present invention utilizing parallel flexure linkage connections between the two movable parts of the extensometer frame, with a sensing arrangement similar to that shown in FIG. 12.
Figure 18:
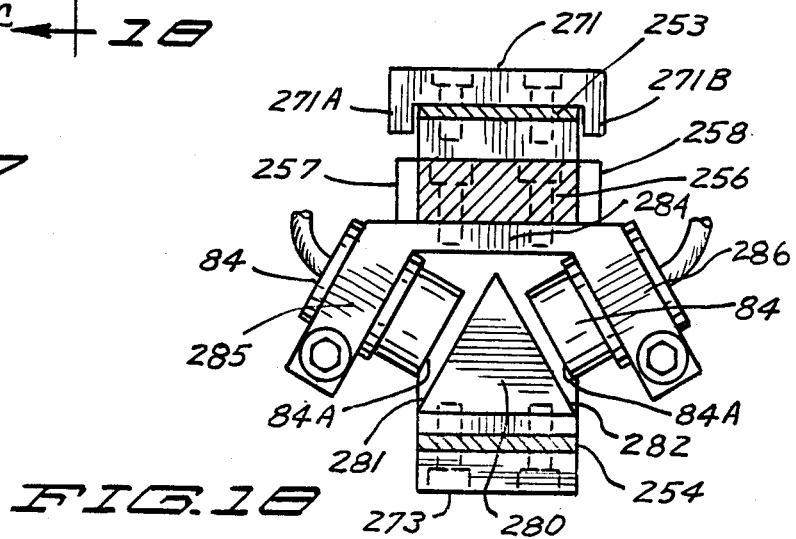
FIG. 18 is a sectional view taken as on line 18—18 in FIG. 17.

FIGS. 17 and 18 disclose a modified form of the capacitive extensometer of the present invention also using parallel link, flexure strap members. As shown, an extensometer 250 includes a main mounting frame or member 251, and a specimen contact knife edge mounting block or member 252. The mounting block 252 is supported relative to the main frame with flexure straps 253 and 254, respectively. These form parallel links that permit controlled relative movement between the mounting block 252 and the main frame 251.

The main frame 251 has a base 255, that is generally triangular shaped, and terminates in an arm portion 256 that has side arms 257 and 258, respectively, as shown in FIG. 18, integral therewith. The side arms 257 and 258 are spaced apart, and at the outer ends thereof a first knife edge mounting block 260 is attached to the arms. A specimen engaging knife edge 261 is mounted with a suitable clamp 262 on the mounting block 260. The knife edge 261 is the element that engages the surface of the specimen to be tested and is held in place with a suitable resilient member as previously shown.

The mounting block 252, in this form of the invention mounts a knife edge 265 with a suitable clamp 266, and has a shoulder 288 that defines a neck portion 270. The shoulder 268 will abut against the bottom part of knife edge mounting block 260 to prevent the knife edges 265 and 261 from moving together more than a desired amount. The neck portion 270 of mounting block 252 passes between the arms 257 and 258, as can be seen, and the neck portion 270 is used for mounting a first end 253A of the flexure beam 253 with a cap type clamp 271 that has legs or flanges 271A and 271B that are positioned on opposite sides of the neck 270 and which align with arms 257 and 258. The legs or flanges 271A and 271B provide a stop against excessive separating movement of the knife edges.

The lower portion of the mounting block 252 mounts a first end portion 254A of the flexure strap 254, with a suitable clamp block 273.

The opposite ends of the flexure straps 253 and 254, indicated at 253B and 254B, are mounted onto surfaces of the base portion 255 of the frame 251 with suitable clamp blocks 274 and 275.

The mounting block 252 as shown has a triangular shaped arm or lug 280 extending laterally therefrom (toward the base end of main frame 251), and this triangular shaped lug has surfaces 281 and 282, respectively, on opposite sides thereof that are at an angle with respect to the bisecting plane of the extensometer which is parallel to the axis of a specimen to be tested. The arm portion 256 of the main frame has a bracket 284 fixed thereto, and the bracket has arm members 285 and 286 on opposite sides each having a plane positioned generally parallel to the respective surfaces 281 and 282. Each of these brackets 285 and 286 form split clamp members, as can be seen in FIG. 17, for holding a proximity detector 84, so that the respective proximity detectors 84 are positioned to have their end surfaces 84A closely spaced from and generally parallel to the surfaces 281 and 282, respectively.

The proximity detectors are of the form previously described, and will sense relative movement between the surfaces 281 and 282 and the detectors when the knife edges 261 and 265 move relative to each other when a specimen is strained. The previously described advantages of using the two angled surfaces for sensing are thus available in this form of the invention. Additionally, the use of the two surfaces permits some ability to linearize output by shaping both of the surfaces to provide a type of compensation.

The flexure members are made with reduced thickness sections 253C and 254C, respectively, adjacent the outer ends to have the flexure axes far apart, and in particular having the flexure axes close to the specimen at the forward (specimen) end of the extensometer. The frame and flexure members are preferably made in as few individual pieces as possible, and thus the flexure members may be machined from the same block of material as the main frame.

This construction provides for good rigidity in degrees of freedom where movement is not wanted while providing friction-free and easy flexure in the direction between the specimen engaging knife edges. The mounting insures that the movement will be smooth and regular as the strain is applied to a specimen coupled to the extensometer.

The extensometer frames, as shown, have openings provided to lessen the mass of the extensometer. The material used also can be selected to minimize weight without sacrificing strength.

The parallel flexure strap mounting arrangement can be used with the parallel plate capacitive sensing shown in FIGS. 1-6. The parallel plate sensing gives an inherently linear output, once properly set. The outer edge of the center plate 46 can be trimmed at an angle to provide linearity adjustment, for example. The parallel flexure strap mounting also is inherently linear. Thus, the flexure strap mounting used with the parallel sensing plates is a desirable arrangement.

The term "capacitive detector" or detector means is meant to include the pure capacitive sensor shown in FIGS. 1-6 and also a capacitor plate mounted adjacent to a target surface for pure capacitance sensing in place of capacitive reactance proximity detectors 84-84D. For pure capacitance sensing the target surface would form a second capacitor plate and changes in gap between the two plates would cause a change in pure capacitance which is a function of gap. The sensing circuitry would provide an output indicating the change in the gap. The plates would be electrically insulated from the extensometer arms. Linearizations of the output of a pure capacitive sensor can be achieved by electronic means and also compensated partially at least by making the target surface a special shape.

In all forms of the invention, the extensometer arms are very rigidly connected together with either a cross flexure assembly or parallel flexure straps so that the arms do not move laterally relative to each, but yet move easily relative to each other in the desired direction, and permit the capacitance sensors to be mounted to sense arm movements.

Low cost, reliable operation is thus achieved.

What is claimed is:

1. A capacitive extensometer assembly comprising:
   a first mounting arm, and a second mounting arm, each having first and second ends;
   means for pivotally connecting said first and second mounting arms together about a pivot axis at second ends thereof to hold the arms spaced apart to form an extensometer assembly for permitting relative movement along a reference axis at first ends of the mounting arms;
   means at said first ends of the arms for engaging a specimen to be tested; and
   a capacitive reactance sensor mounted on the extensometer assembly to sense movement between the first and second mounting arms, said sensor including a first capacitive reactance detector mounted on the first mounting arm, the capacitive reactance detector being capable of detecting spacing with respect to a target surface, and a target surface mounted on the second mounting arm in registry with said capacitive reactance detector, said capacitive reactance detector and target surface being mounted on the respective arms between the pivot axis and the reference axis, said capacitive reactance detector and target surface being adjacent in a rest position and the capacitive reactance detector being sensitive to changes in the relative spacing thereof from the target surface.

2. A capacitive extensometer assembly comprising:
   a first mounting member, and a second mounting member, each having first and second ends;
   means for pivotally connecting said first and second mounting members to each other about a pivot axis at second ends thereof to hold the members spaced apart to form an extensometer assembly for permitting relative pivotal movement along a reference axis at first ends of the mounting members;
   a capacitive reactance detector mounted on one of said mounting members, said capacitive reactance detector being capable of detecting spacing with respect to a target surface; and
   means forming a target surface mounted on the other of said mounting members in registry with said capacitive reactance detector and adjacent thereto with the mounting members in a rest position, said target surface being curved in cross section and said capacitive detector being mounted on the one mounting member adjacent said target surface so that the relative arc of movement of the capacitive detector and target surface as the mounting members pivotally move relative to each other is different from the cross sectional curve configuration of the target surface.

3. The apparatus as specified in claim 2 wherein said capacitive detector is adjustably mounted for movement along the longitudinal length of the arm on which it is mounted.

4. The apparatus of claim 2 wherein said curved target surface is concave.

5. The apparatus of claim 2 wherein said curved target surface is convex.

6. The apparatus of claim 1 wherein said means for connecting said first and second mounting members together comprise flexure strap means controlling the position of the first and second members in their path of movement relative to each other.

7. The apparatus of claim 6 wherein said flexure strap means comprise crossed flexure straps each connected to the first and second arms at second ends thereof, said crossed flexure straps forming an axis for pivotal movement of the first ends of said arms.

8. A capacitive extensometer assembly comprising;
   first and second mounting members;
   flexure strap means connecting said first and second mounting members and comprising a pair of straps, both attached to the first and second mounting members at first ends of the mounting members and at opposite ends of the straps, respectively, and the straps being yieldable in bending to permit pivotal movement of second ends of the mounting members relative to each other;
   specimen coupling means mounted on each mounting member for engaging a specimen to be tested by subjecting the specimen to strain along an axis and causing the specimen coupling means to move relative to each other as constrained by the flexure strap means;
   a capacitive reactance proximity detector mounted on a first of said mounting members, said proximity detector being capable of detecting spacing with respect to a target surface;
   means forming a target surface mounted on the second mounting member, said target surface being curved, and being adjacent to an end surface of the proximity detector with the mounting members in a reference position, said proximity detector having a curved end surface adjacent to the target surface and of complemental curvature, the pivotal arc of movement of the proximity detector relative to the target surface as the mounting members pivot being different from the curve of the proximity detector end surface and the target surface; and
   means coupled to the capacitive reactance proximity detector for providing an output indicating relative movement of the first and second mounting members.

9. The apparatus as specified in claim 8 wherein the mounting members comprise a pair of arms, and said flexure strap means comprise cross flexure straps hingedly coupling the arms at first ends thereof about a hinge axis and wherein said target surface, the second axis being offset from the hinge axis.

10. The apparatus as specified in claim 9 wherein said target surface is concave and the radial distance from the second axis to the target surface at any place along the target surface is different than the radial distance of the proximity detector from the hinge axis.

11. An extensometer assembly comprising:
    a first arm and a second arm having longitudinally extending planes;
    hinge means connecting said first and second arms for movement about a hinge axis adjacent first ends of the first and second arms, the hinge axis being generally parallel to the longitudinally extending planes of the first and second arms;
    means at second ends of the first and second arms for engaging a specimen to be tested;
    proximity detector means adjustable mounted on a first of said arms between the hinge axis and the second end of the second arm;
    means defining a target surface mounted on the second arm between the hinge axis and the second end of the first arm to provide a surface aligning with and adjacent the proximity detector means; and
    said proximity detector means providing an output as a function of changes in the relative spacing between the proximity detector means and the target surface.

12. The apparatus as specified in claim 8 wherein said target surface is convex and the end of the proximity detector is concave.

13. The apparatus of claim 11 wherein the target surface is generated about a second axis parallel to the hinge axis, the second axis being spaced from the hinge axis.

14. The apparatus of claim 11 wherein the target surface is concave and th second axis is offset from the hinge axis.

* * * * *

UNITED STATES PATENT AND TRADEMARK OFFICE
CERTIFICATE OF CORRECTION

PATENT NO. : 4,831,738

DATED : May 23, 1989

INVENTOR(S) : Harry R. Meline et al.

It is certified that error appears in the above-identified patent and that said Letters Patent is hereby corrected as shown below:

Column 13, line 64, delete "members", and insert --arms--.

Column 14, delete lines 38-43, and insert the following:

"The apparatus as specified in claim 8 wherein the mounting members comprise a pair of arms, and said flexure strap means comprise cross flexure straps hingedly coupling the arms at first ends thereof about a hinge axis and wherein said target surface is generated about a second axis parallel to the hinge axis and faces toward the first ends of said extensometer arms, and said proximity detector being mounted on the other arm adjacent said target surface, the second axis being offset from the hinge axis."

Signed and Sealed this

Third Day of April, 1990

Attest:

HARRY F. MANBECK, JR.

Attesting Officer

Commissioner of Patents and Trademarks